US009190723B1

(12) United States Patent
Hong et al.

(10) Patent No.: US 9,190,723 B1
(45) Date of Patent: Nov. 17, 2015

(54) MULTI-INPUT AND MULTI-OUTPUT (MIMO) ANTENNA SYSTEM WITH ABSORBERS FOR REDUCING INTERFERENCE

(75) Inventors: Yang-Ki Hong, Tuscaloosa, AL (US); Seok Bae, Ansan (KR); Jae-Jin Lee, Tuscaloosa, AL (US)

(73) Assignee: The Board of Trustees for and on behalf of the University of Alabama, Tuscaloosa, AL (US)

( * ) Notice: Subject to any disclaimer, the term of this patent is extended or adjusted under 35 U.S.C. 154(b) by 18 days.

(21) Appl. No.: 13/247,515

(22) Filed: Sep. 28, 2011

Related U.S. Application Data (60) Provisional application No. 61/387,355, filed on Sep. 28, 2010.

(51) Int. Cl.
*H01Q 1/52* (2006.01)
*H01Q 21/28* (2006.01)

(52) U.S. Cl.
CPC ............... *H01Q 1/52* (2013.01); *H01Q 1/521* (2013.01); *H01Q 21/28* (2013.01)

(58) Field of Classification Search
CPC ......... H01Q 1/52; H01Q 1/521; H01Q 1/523; H01Q 1/525; H01Q 1/526
USPC .................. 343/700 MS, 702, 893, 904, 787
See application file for complete search history.

(56) References Cited

U.S. PATENT DOCUMENTS

| | | | |
|---|---|---|---|
| 6,721,550 B1 | 4/2004 | Okada et al. | |
| 6,744,412 B1 | 6/2004 | Lopez | |
| 6,757,267 B1 | 6/2004 | Evans et al. | |
| 7,099,631 B2 * | 8/2006 | Lee et al. | 455/90.1 |
| 7,253,779 B2 | 8/2007 | Greer et al. | |
| 7,324,794 B2 | 1/2008 | Chari et al. | |
| 7,352,328 B2 | 4/2008 | Moon et al. | |
| 7,411,554 B2 | 8/2008 | Jung et al. | |
| 7,427,949 B2 | 9/2008 | Channabasappa et al. | |
| 7,477,202 B2 | 1/2009 | Zhu et al. | |
| 7,548,208 B2 * | 6/2009 | Dou et al. | 343/702 |
| 7,573,433 B2 | 8/2009 | Qin | |
| 7,586,445 B2 | 9/2009 | Qin et al. | |
| 7,660,598 B2 | 2/2010 | Barnett et al. | |
| 7,724,201 B2 | 5/2010 | Nysen et al. | |
| 7,729,317 B2 | 6/2010 | Payne et al. | |
| 7,792,084 B2 | 9/2010 | Yamamoto et al. | |
| 7,812,768 B2 | 10/2010 | Liu et al. | |
| 8,531,337 B2 * | 9/2013 | Soler Castany et al. | 343/702 |
| 2005/0090299 A1 * | 4/2005 | Tsao et al. | 455/575.5 |
| 2007/0069960 A1 | 3/2007 | Moon et al. | |
| 2007/0115181 A1 | 5/2007 | Park et al. | |
| 2008/0224932 A1 * | 9/2008 | Suematsu et al. | 343/702 |
| 2008/0267151 A1 * | 10/2008 | Hartenstein | 370/338 |
| 2009/0046029 A1 * | 2/2009 | Nagai | 343/850 |
| 2010/0295739 A1 * | 11/2010 | Wu et al. | 343/702 |

* cited by examiner

*Primary Examiner* — Robert Karacsony
*Assistant Examiner* — Patrick Holecek
(74) *Attorney, Agent, or Firm* — Maynard Cooper & Gale, P.C.; Jon E. Holland (57) ABSTRACT

A Multi-Input-Multi-Output (MIMO) system has multiple radiation elements and absorbers disposed on a substrate. The absorbers are positioned about the radiation elements to reduce the interference between the radiation elements. Use of the absorbers permits interference levels comparable to conventional MIMO systems using spatial diversity without requiring the antennas to be separated by at least one-half of the wavelength of the communicated signals. A ground plane on the substrate is also positioned on the substrate to enhance antenna system performance.

32 Claims, 7 Drawing Sheets

| | MIMO A 100A | MIMO B 100B | MIMO without absorbers |
|---|---|---|---|
| Center frequency (GHz) | 2.05 | 2.06 | 2.78 |
| Bandwidth (MHz) | 1060 | 1200 | 1620 |
| Isolation at 2.45 GHz (dB) | -15.4 | -20.7 | -7.3 |
| Gain at 2.45 GHz (dBi) | -0.18 | -2.51 | 2.5 |

MULTI-INPUT AND MULTI-OUTPUT (MIMO) ANTENNA SYSTEM WITH ABSORBERS FOR REDUCING INTERFERENCE

CROSS REFERENCE TO RELATED APPLICATION

This application claims priority to U.S. Provisional Patent Application No. 61/387,355, entitled "Multi-Input and Multi-Output (MIMO) Communication Systems and Methods Utilizing Antennas with Interference Absorbers," and filed on Sep. 28, 2010, which is incorporated herein by reference.

RELATED ART

A Multi-Input-Multi-Output (MIMO) communication system uses multiple antennas at a transmitter and a receiver. A MIMO arrangement has been shown to improve communication system performance by an increase of the data transmission rate without an increase in transmitter power. In order for a MIMO system to be effective, there should be some way to provide diversity, i.e., to reduce signal interference. There are at least three well-known diversity techniques used for MIMO systems. One technique involves spacing or separating antennas on a transmitter and antennas on a receiver so that the separated antennas at the receiver receive a higher quality signal. The separating technique has limitations if a transmitter or a receiver must be small, such as, for example a hand-held device. A pattern diversity technique involves transmitting divergent radiation patterns from each antenna. For the technique of polarization diversity, different polarization (horizontal, vertical, circular or elliptical) signals are transmitted from each of two or more antennas. In some applications it may be possible to combine the diversity techniques to further enhance performance.

The use of spatial separation of antennas, as indicated above, has equipment size limitations, i.e., the equipment must be relatively large, because antennas typically should be separated by at least one-half of the wavelength of the frequency of the transmitted signal. That results, for example, in antenna separation of around 6.12 centimeters (cm) when operating at a transmit frequency of 2.45 GHz. Consequently, spatial separation is problematic for portable devices such as cell phones and laptop computers. Because the size limitations associated with spatial diversity seem difficult to overcome, much of the research and development in MIMO systems has been directed towards non-spatial separation techniques.

It has been reported that the half wavelength antenna separation for spatial diversity is equivalent to having about −15 dB of antenna isolation as described in an article by J. H. Byun et al, in Microwave and Optical Technology Letters, Vol. 50, No. 10, pp. 2600-2604, October, 2008. Hence, if it were possible to provide an isolation of −15 dB with antennas spaced at a fraction of a wavelength of the transmitted signal frequency, then spatial separation would be more desirable as a diversity technique for MIMO communication systems.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

A Multi-Input-Multi-Output (MIMO) antenna system is often used to improve the performance of a wireless data communication system. In general, a MIMO antenna system comprises a multiplicity of antennas coupled to a transceiver of the data communication system. In order for the MIMO antenna system to provide an increase in data communication rates, radiation for each antenna should not significantly interfere with radiation from other antennas of the antenna system. In that regard, it is generally desirable for an antenna system to provide −15 dB or less of interference. Conventional systems provide a desired interference level by separating antennas by at least one-half of a wavelength of the transmission frequency. In one exemplary embodiment, a MIMO antenna system of the present disclosure limits interference to −15 dB with antenna separation of one-fourth of a wave length. In such embodiment, radiation elements (one for each antenna) are disposed on a substrate, and a portion of each radiation element is partially surrounded with absorption material. The absorption material is disposed and positioned on the substrate so that interference between antennas is within a desired range.

Figure 1:
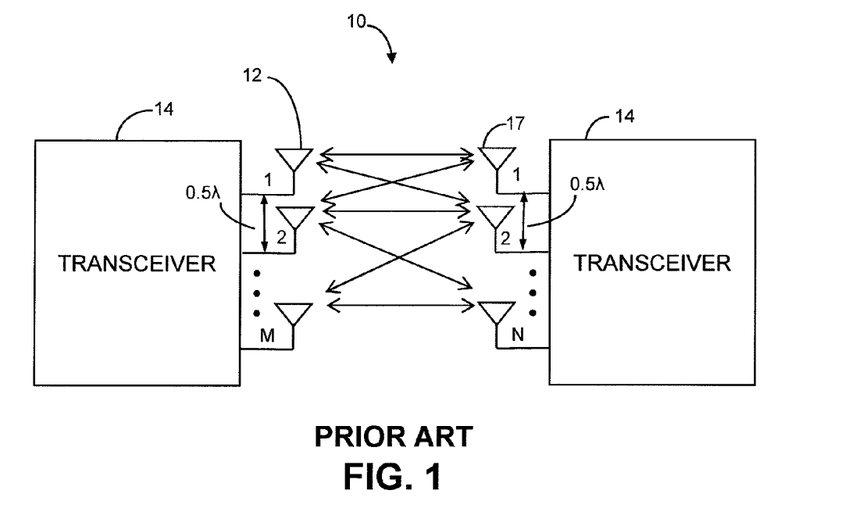
FIG. 1 is a block diagram depicting a conventional wireless Multi-Input-Multi-Output communication system having a conventional antenna array.

The present disclosure relates to MIMO antenna systems using spatial diversity for reducing antenna interference. FIG. 1 shows a conventional MIMO antenna system 10 having multiple antennas 12 at a transceiver 14 and multiple antennas 17 at another transceiver 14. For the conventional antenna system 10 of FIG. 1, there are M antennas 12 at the transceiver 14 and N antennas 17 at the other transceiver 14. For some conventional MIMO antenna systems using spatial diversity, M and N may be equal. The antenna system 12 at the transceiver 14 may serve as a transmit antenna when the transceiver 14 is in a transmit mode and may serve as a receive antenna when the transceiver 14 is in a receive mode. In some communication systems, the transceiver 14 may be simultaneously transmitting and receiving. The antenna system 17 at the other transceiver 14 provides similar functionality.

The antennas 12 and 17 as depicted in FIG. 1 have a separation of at least one half of a wavelength, i.e., at least 0.5λ, where λ is the wavelength of the carrier frequency of the communication signal. An antenna separation of at least 0.5λ for the conventional system 10 achieves sufficient spatial diversity so that interference between neighboring antennas does not cause an undesirable amount of transceiver signal distortion. For a transceiver frequency of 2.45 GHz, λ is 122 mm so that one half of a wavelength is 61 mm. If a conventional communication system is small, e.g., 20 mm by 40 mm, a separation of 61 mm for two antennas is problematic. Hence, there is a need to provide reduced antenna separation without resulting in undesirable levels of interference between neighboring antennas.

Figure 2:
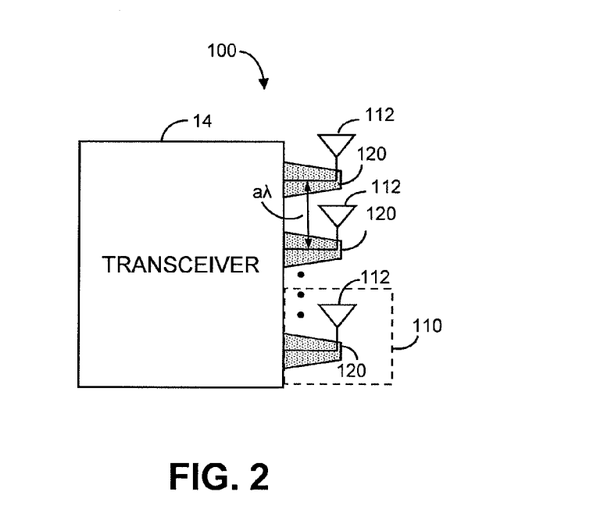
FIG. 2 depicts an exemplary embodiment of a Multi-Input-Multi-Output antenna system for a communication system in accordance with the present disclosure.

FIG. 2 depicts an embodiment of a MIMO antenna system 100 for a MIMO communication system of the present disclosure. The antenna system 100 is depicted having M antennas. Each antenna 110 of the M antennas comprises a radiation element 112 and an absorber 120. The separation of the radiation elements 112 is equal to aλ where "a" is less than 0.5 and may have values of about 0.2 or less. The radiation element 112 of each antenna 110 is disposed on a substrate as will be further described herein. Each radiation element 112 has a respective absorber 120 that is disposed on the substrate and positioned to limit interference between neighboring radiation elements 112. In one embodiment, the radiation element 112 is a monopole antenna. In other embodiments other types of radiation elements are possible.

Figure 3:
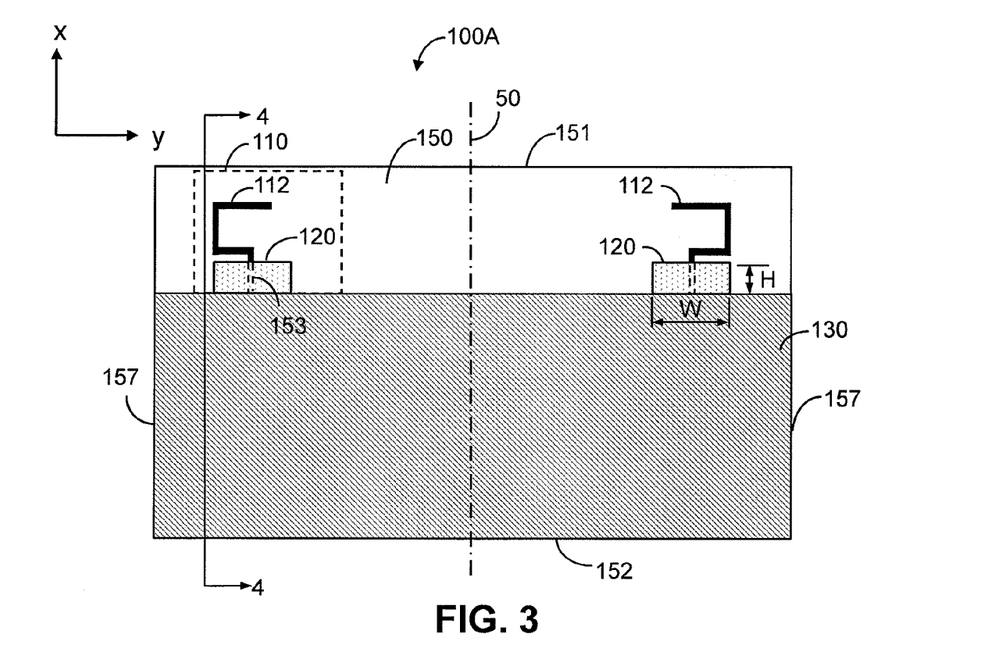
FIG. 3 depicts an exemplary embodiment of a Multi-Input-Multi-Output antenna in accordance with the present disclosure.

FIG. 3 depicts a top view of an embodiment of a MIMO antenna system 100A in accordance with the present disclosure. The system 100A comprises two antennas 110 that are coupled to a transceiver 14, best seen in FIG. 4. Each antenna 110 comprises a radiation element 112 and an absorber 120. The antennas 110 are positioned symmetrically about a center line 50. A base 153 of each radiation element 112 is coupled to a feed element 154 that provides a conductive path to the transceiver 14. Each radiation element 112 can be disposed, i.e., formed by know fabrication techniques, on a substrate 150. In one embodiment, the substrate material is Duriod. In other embodiments other substrate materials are possible including substrates that have magnetic and dielectric properties.

Figure 4:
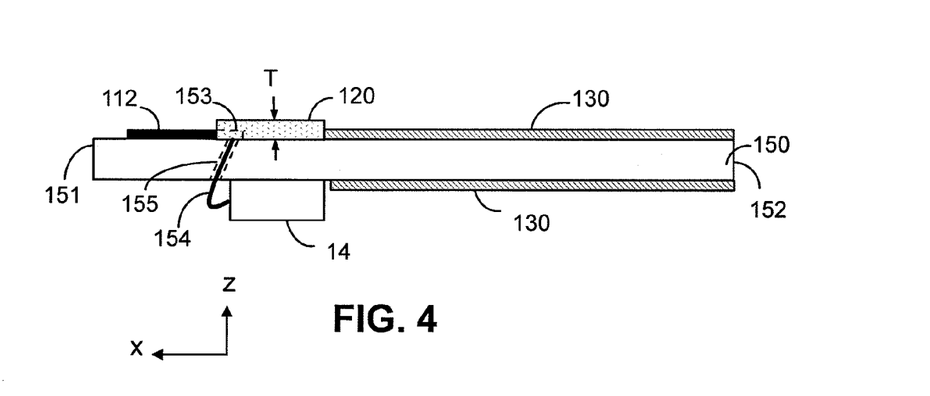
FIG. 4 depicts a section view of the exemplary embodiment depicted by FIG. 3.

Radiation elements 112 have a desirable shape, such as, for example, a monopole antenna shape or other antenna shape. The radiation elements 112 are disposed on an upper left corner and an upper right corner of substrate 150, i.e., where a front edge 151 intersects a side edge 157 (two are shown). On a back portion and a top surface of the substrate 150, between a back edge 152 and the feed elements 154, is a rectangular-shaped ground plane 130 as depicted in FIG. 3. The ground plane 130 has a width measured in the x-direction and a length measured in the y-direction where the length is defined as the distance between one side edge 157 and the other side edge 157 of substrate 150. There is a ground plane 130 and a transceiver 14 on a bottom surface of the substrate 150 as depicted in FIG. 4. A via 155 provides a conductive path for feed element 154 to couple with radiation element 112.

For the embodiment of the antenna system 100A of FIG. 3, absorption material is disposed on the substrate 150 in a rectangular shape depicted as having a width, W, and a height, H. For one embodiment, W has values between approximately 2 and 5 mm, H has values between approximately 3 and 6 mm, and T, the thickness shown in FIG. 4, has values between approximately 1 and 3 mm. It would be understood by those skilled in the art that dimensions for an absorber can be decreased as radiation frequency increases. The absorption material forms each absorber 120 of each antenna 110. The absorber 120 is positioned to reduce interference between the radiation elements 112 of the two antennas 110. As depicted in FIG. 3, the absorber 120 covers, e.g., it is positioned on top of, the base 153 of radiation element 112. The disposed absorption material has a thickness, T, as shown in FIG. 4. For one embodiment, the absorption material is a Ni—Zn ferrite-silicone composite. Other materials for absorbing radiation are possible in other embodiments of the MIMO antenna system 100A. In that regard, parameters of absorber materials are selected to minimize interference and to provide a desirable antenna gain. In one exemplary embodiment, desired values of antenna gain for the MIMO antenna system 100A have values in the range between about 2.0 and −5.0 dBi.

FIG. 4 depicts the transceiver 14 mounted on the bottom surface of the substrate 150. The feed element 154, as depicted, couples the transceiver 14 to the radiation element 112 of one antenna 110, such as the antenna 110 in the upper left corner of the substrate 150 depicted in FIG. 3. It would be readily understood by those in the art that the other feed element 154 couples the transceiver 14 to the other antenna 110 shown in the upper right corner of the substrate 150. The ground planes 130 on the top surface and the bottom surface 130 enhance antenna performance and provide shielding for electronic components (not shown) that may be mounted on the bottom side of the substrate.

Figure 5:
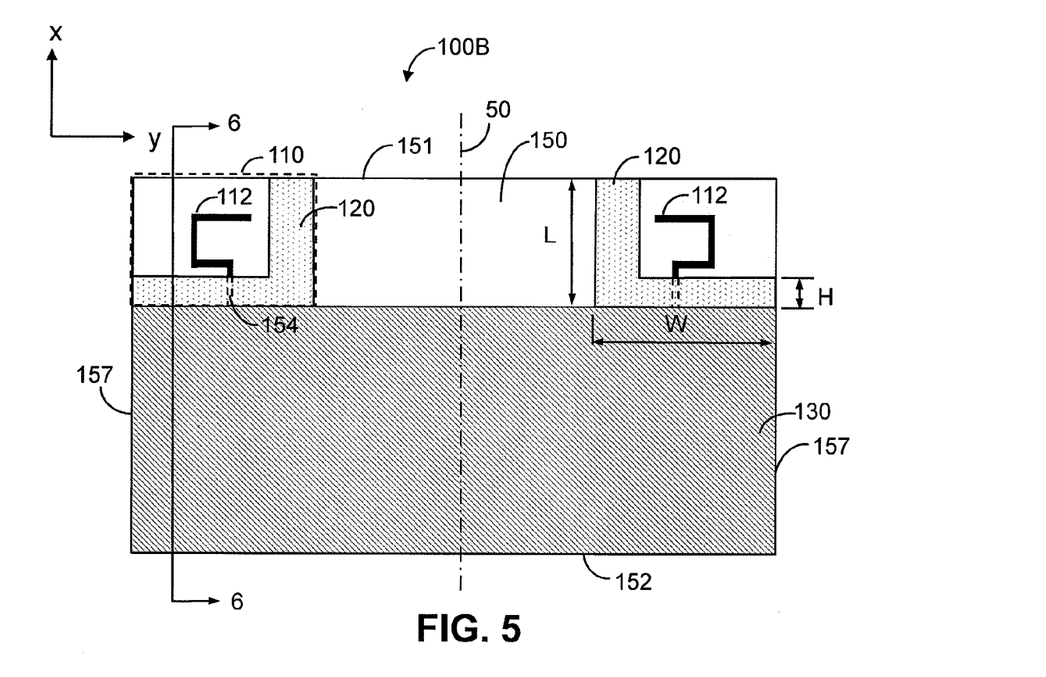
FIG. 5 depicts an exemplary embodiment of a Multi-Input-Multi-Output antenna in accordance with the present disclosure.
Figure 6:
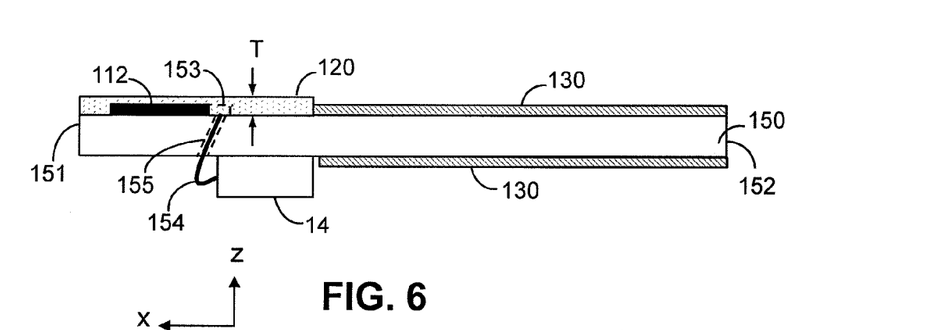
FIG. 6 depicts a section view of the exemplary embodiment depicted by FIG. 5.

FIG. 5 depicts a top view of an embodiment of a MIMO antenna system 100B in accordance with the present disclosure. The system 100B comprises two antennas 110 that are coupled to a transceiver 14 as shown in FIG. 6. Each antenna 110 comprises a radiation element 112 and an absorber 120. The antennas 110 are positioned symmetrically about the center line 50. A base 153 of each radiation element 112 is coupled to a feed element 154 that serves as a coupler for the transceiver 14. Each radiation element 112 is disposed on a substrate 150. Radiation elements 112 have a desirable shape, such as, for example, a monopole antenna shape or other antenna shape. The radiation elements 112 as shown are disposed on an upper left corner and an upper right corner of substrate 150, i.e., where a front edge 151 intersects of a side edge 157 (two are shown). On the back portion of the substrate 150, between back a edge 152 of the substrate 150 and the feed elements 154 is a rectangular shaped ground plane 130 with a width measured in the x-direction: The ground plane 130 has a length measured in the y-direction and defined by the distance between one side edge 157 and the other side edge 157 of substrate 150. There is also a ground plane 130 on another surface, bottom surface, of the substrate 150 as shown in FIG. 6.

For the embodiment of the antenna system 100B of FIG. 5, absorption material is disposed on the substrate 150 forming an L-shaped absorber 120 depicted as having a width, W, a length, L, and a height, H. For one embodiment, W has values between approximately 7 and 15 mm, L has values between approximately 6 and 12 mm, H has values between approximately 3 and 6 mm, and T, the thickness shown in FIG. 6, has values between approximately 1 and 3 mm. The absorption material forms the absorber 120 of each antenna 110. The absorber 120 partially surrounds radiation element 112 and is positioned about the radiation element 112 to reduce interference between the radiation elements 112 of the two antennas 110. As depicted in FIG. 5, the absorber 120 for the upper left corner antenna 110 has one leg that goes in the y-direction from a side edge 157 towards the center of the substrate 150 and another leg that goes in the x-direction away from the ground plane 130 towards the top edge 151 of the substrate 150. The right-corner antenna 110 depicted in FIG. 5 is a mirror image of the left-corner antenna 110.

FIG. 6 depicts the transceiver 14 mounted on the bottom side of the substrate 150. The feed element 154, which is composed of conductive material, extending through a via 155 couples the transceiver 14 to the base 153 of radiation element 112 of one antenna 110, such as the antenna 110 in the upper left corner of the substrate 150 as depicted in FIG. 5. It would be readily understood by those in the art that another feed element 154 couples the transceiver 14 to the other antenna 110, such as the antenna 110 shown in the upper right corner of the substrate 150. The ground plane 130 on the top surface and the bottom surface 130 enhances antenna performance and provides shielding for electronic components (not shown) that may be mounted on the bottom side of the substrate 150.

Figure 7:
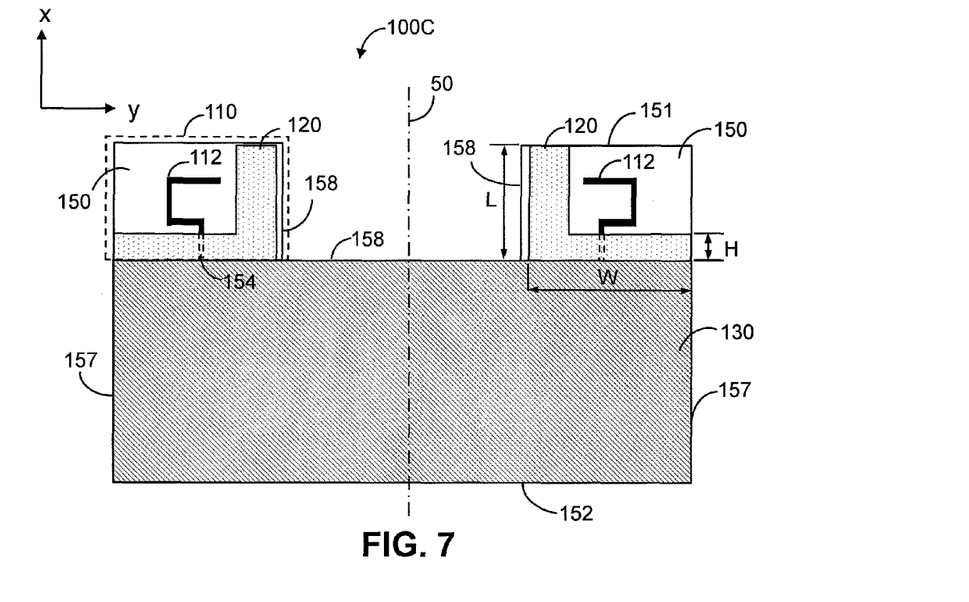
FIG. 7 depicts an exemplary embodiment of a Multi-Input-Multi-Output antenna in accordance with the present disclosure.

FIG. 7 depicts a top view of an embodiment of a MIMO antenna system 100C in accordance with the present disclosure. The MIMO antenna system 100C comprises two antennas 110 that are coupled to a transceiver 14. The antennas 110 are positioned symmetrically about the center line 50. Each radiation element 112 is coupled to a feed element 154 that serves as a coupler to the transceiver 14. Each radiation element 112 is disposed on a substrate 150 and has a desired shape, such as, for example, a monopole antenna shape or other antenna shape. The radiation elements 112 as shown are disposed on an upper left corner and an upper right corner of substrate 150, i.e., where a front edge 151 intersects of a side edge 157 (two are shown). The substrate 150 of FIG. 7 has a notch defined by edges 158 of the substrate 150. The material removed to form the notch replaces the dielectric material between the antennas 110 with free space. The embodiment of MIMO antenna system 100C, wherein a portion of the substrate 150 is removed, has a reduced cost of substrate material. The performance MIMO antenna system 100C is similar the performance of MIMO antenna system 100B.

Figure 8:
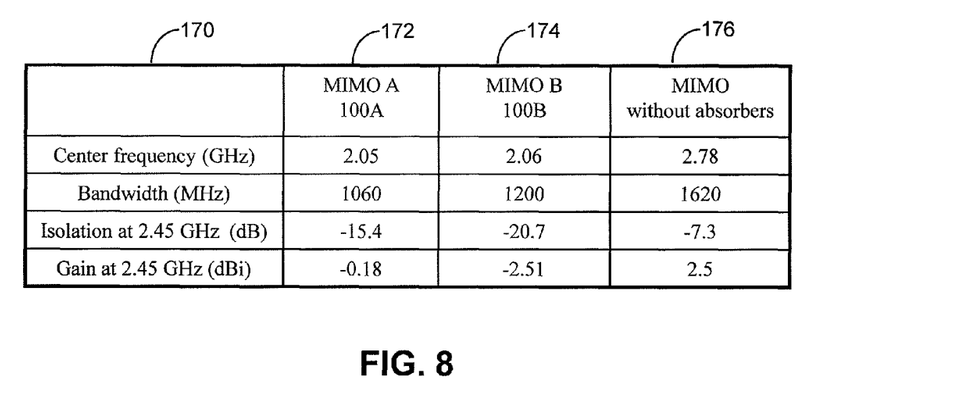
FIG. 8 is a table comparing performance of exemplary antenna systems.

The table shown in FIG. 8 compares exemplary performances of MIMO antenna systems 100A, 100B with absorbers 120 to a conventional MIMO system antenna system 10 with an antenna spacing the same as for MIMO antenna system 100B. The performance parameters for system 100A are shown in second column 172, in third column 174 for system 100B, and in fourth column 176 for the conventional system 10. It is notable that systems 100A and 100B provide antenna isolation of less than −15 dB, but that the conventional MIMO antenna system 10 has an isolation of only −7.3 dB. The antenna gains for systems 100A and 100B are respectively −0.18 dBi and −2.51 dBi, which means they are less than the conventional MIMO antenna system gain of 2.5 dBi. However, the gain values of MIMO antenna systems 100A, 100B when combined with the isolation values provide improved MIMO antenna performance.

Figure 9:
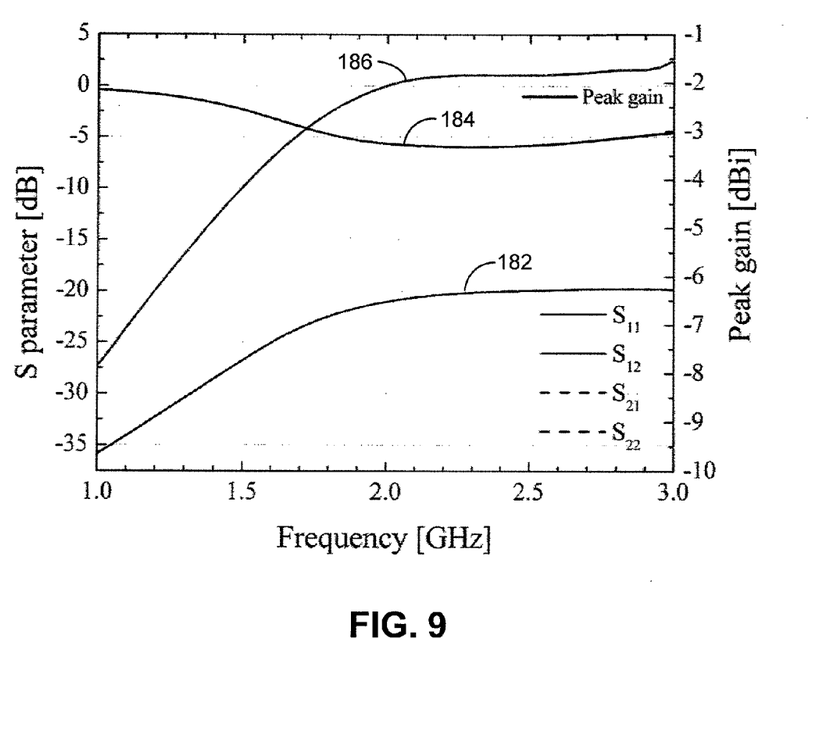
FIG. 9 is a graph depicting exemplary parameters of the embodiment of FIG. 5.

The graph of FIG. 9 shows exemplary variations of S-parameters as a function of frequency for the MIMO antenna system 100B of FIG. 5. The values for $S_{12}$ and $S_{21}$ are identical and depicted by curve 182. Parameters $S_{12}$ and $S_{21}$ describe the amount of isolation between two antennas 110, indicating that the MIMO system 100B has a desired amount of isolation over the frequency range from 1.0 to 3.0 GHz. The impedance matching characteristics of the MIMO antenna system 100B are indicated by the values of $S_{11}$ and $S_{22}$, as shown by curve 184. Antenna gain for MIMO system 100B falls off sharply as frequencies decrease from 2.0 GHz to 1.0 GHz as shown by curve 186. Antenna gain has acceptable values for frequencies greater than 2.0 GHz.

Figure 10:
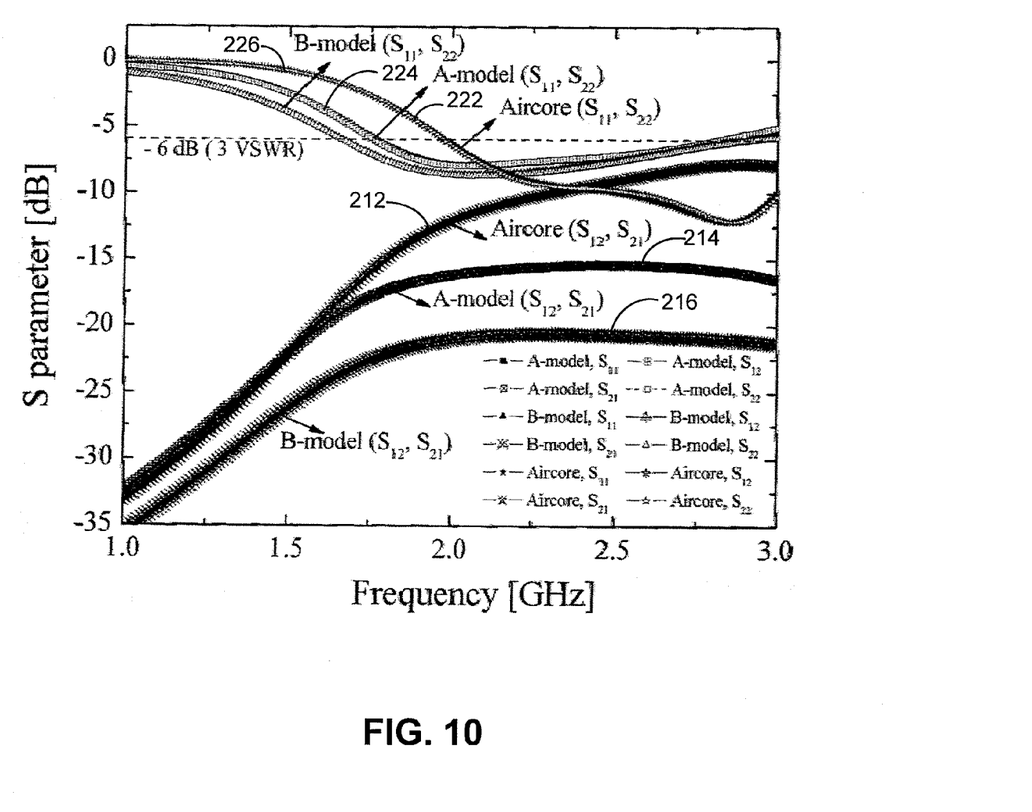
FIG. 10 is a graph comparing exemplary parameters of the embodiments of FIG. 3 and FIG. 5 with a conventional antenna system.

The graph of FIG. 10 shows a comparison of exemplary S-parameters for MIMO antenna system 100A, MIMO antenna system 100B, and conventional MIMO antenna system 10 with 2 antennas. The S-parameters for the conventional MIMO antenna system are depicted by curve 222 ($S_{11}$ and $S_{22}$) and curve 212 ($S_{12}$ and $S_{21}$). The S-parameters for the MIMO antenna system 100A are depicted by curve 224 ($S_{11}$ and $S_{22}$) and curve 214 ($S_{12}$ and $S_{21}$). The S-parameters for the MIMO system 100B are depicted by curve 226 ($S_{11}$ and $S_{22}$) and curve 216 ($S_{12}$ and $S_{21}$).

Figure 11:
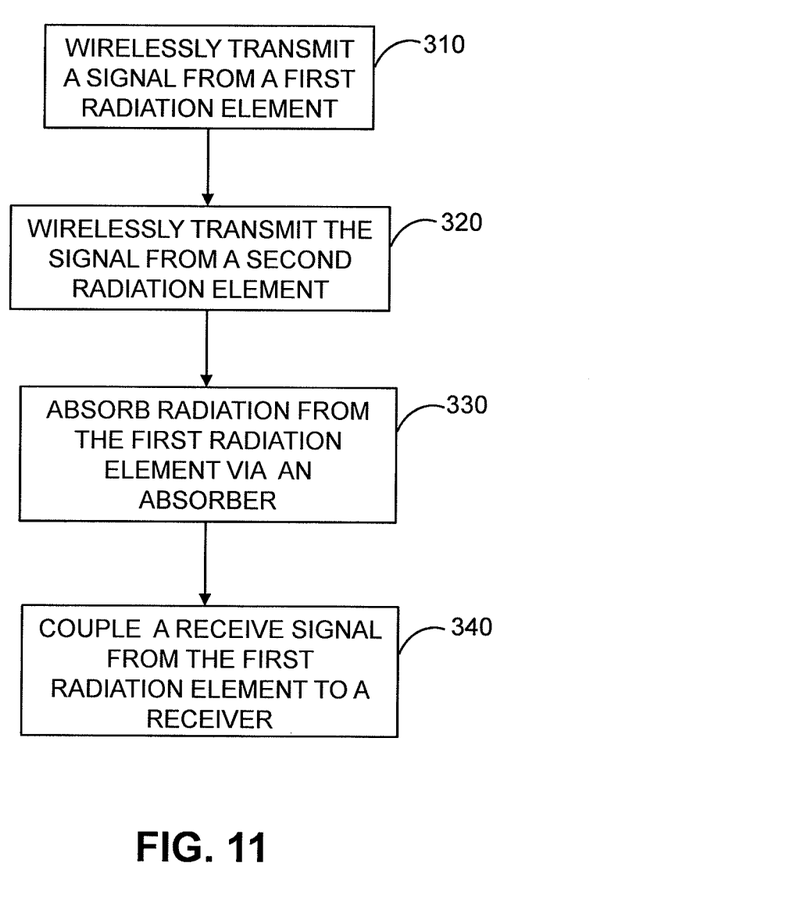
FIG. 11 is a flowchart illustrating an exemplary method for reducing interference between radiation elements of a Multi-Input-Multi-Output system.

An exemplary embodiment for reducing interference between radiation elements of a Multi-Input-Multi-Output system is depicted by FIG. 11. A transmitter wirelessly transmits a signal from a first radiation element, as shown in block 310. The transmitter also wirelessly transmits the signal from a second radiation element, as shown in block 320. Radiation energy from at least the first radiation element is absorbed via an absorber, thereby reducing interference, as shown in block 330. The first radiation element also serves to receive and couple a receive signal to a receiver, as shown in block 340.

Now therefore, the following is claimed:

1. A Multi-Input-Multi-Output (MIMO) system comprising:
   a first antenna disposed on a substrate;
   a second antenna disposed on the substrate, the second antenna comprising a radiation element and an absorber for absorbing radiation, wherein the absorber partially surrounds the radiation element and is between the first and second antennas; and
   a transceiver coupled to the first antenna and the second antenna and configured to transmit a wireless signal via the first and second antennas, wherein the first antenna is separated from the second antenna by less than one-half of a wavelength of the signal, and wherein the absorber is positioned such that coupling between the first antenna and the second antenna is less than −15 decibels (dB) over a frequency range greater than 1.0 Gigahertz (GHz).

2. The MIMO system of claim 1, wherein the first antenna is a monopole antenna and the second antenna is a monopole antenna.

3. The MIMO system of claim 1, wherein the absorber of the second antenna has a rectangular shape.

4. The antenna system of claim 1, wherein the absorber of the second antenna has an L-shape.

5. The MIMO system of claim 1, wherein the absorber of the second antenna is composed of a ferrite-silicone composite.

6. The MIMO system of claim 1, wherein a thickness of the absorber of the second antenna is less than 3.0 mm.

7. The MIMO system of claim 1, wherein the first antenna comprises a radiation element and an absorber for absorbing radiation, wherein the absorber of the first antenna partially surrounds the radiation element of the first antenna.

8. The MIMO system of claim 1, wherein the absorber is formed on the radiation element.

9. The MIMO system of claim 1, wherein at least a portion of the radiation element is positioned between the absorber and the substrate.

10. The MIMO system of claim 1, wherein the first antenna is separated from the second antenna by less than one-quarter of the wavelength of the signal.

11. The MIMO system of claim 1, wherein the radiation element has a base that is conductively coupled to a feed element, wherein the feed element is conductively coupled to the transceiver, wherein the absorber covers the base such that the base is between material of the absorber and the substrate, and wherein at least a portion of the radiation element is not covered by the absorber.

12. The MIMO system of claim 1, wherein the absorber is positioned such that coupling between the first antenna and the second antenna is less than −15 decibels (dB) from at least 1.0 Gigahertz (GHZ) to at least 3.0 GHZ.

13. The MIMO system of claim 12, wherein antenna gain for the first and second antennas is greater than −2 dBi from at least 2.0 GHZ to at least 3.0 GHZ.

14. A Multi-Input-Multi-Output (MIMO) system, comprising:
  a substrate;
  a first radiation element and a second radiation element disposed on the substrate, wherein the first radiation element is separated from the second radiation element by a distance of less than one-half of a wavelength of a wireless signal;
  a transceiver configured to transmit the wireless signal via the first radiation element and the second radiation element; and
  an absorber shaped and positioned about the first radiation element and between the first and second radiation elements for limiting interference between the first radiation element and the second radiation element,
  wherein the absorber is positioned such that coupling between the first antenna and the second antenna is less than −15 dB over a frequency range greater than 1.0 Gigahertz (GHZ).

15. The MIMO system of claim 14, wherein the first radiation element and the second radiation element are monopole antennas.

16. The MIMO system of claim 14, wherein the absorber has a rectangular shape.

17. The MIMO system of claim 14, wherein the absorber has an L-shape.

18. The MIMO system of claim 14, wherein a ground plane is disposed on the substrate.

19. The MIMO system of claim 14, wherein the absorber is composed of a ferrite-silicone composite.

20. The MIMO system of claim 14, wherein the absorber is formed on the first radiation element.

21. The MIMO system of claim 14, wherein at least a portion of the first radiation element is positioned between the absorber and the substrate.

22. The MIMO system of claim 14, wherein the absorber is positioned such that coupling between the first antenna and the second antenna is less than −15 decibels (dB) from at least 1.0 Gigahertz (GHZ) to at least 3.0 GHZ.

23. A method for reducing interference in a Multi-Input-Multi-Output (MIMO) system, comprising:
  wirelessly transmitting a signal from a first radiation element of a first antenna of the MIMO system;
  wirelessly transmitting the signal from a second radiation element of a second antenna of the MIMO system; and
  absorbing radiation from the first radiation element via an absorber that is positioned around the first radiation element and between the first and second radiation elements,
  wherein the first and second radiation elements are separated by a distance of less than one-half of a wavelength of the signal, and wherein coupling between the first antenna and the second antenna is less than −15 dB over a frequency range greater than 1.0 Gigahertz (GHZ).

24. The method of claim 23, wherein the absorber has a rectangular shape.

25. The method of claim 23, wherein the absorber has an L-shape.

26. The method of claim 23, wherein the first radiation element, the second radiation element and the absorber are disposed on a substrate.

27. The method of claim 26, wherein a ground plane is disposed on the substrate.

28. The method of claim 23, further comprising coupling a receive signal from the first radiation element to a receiver.

29. The method of claim 23, wherein the absorber is formed on the second radiation element.

30. The method of claim 23, wherein the absorber extends around the second radiation element such that the absorber is positioned on opposite sides of the second radiation element.

31. The method of claim 23, wherein the first antenna and the second antenna are disposed on a substrate, and wherein at least a portion of the first radiation element is positioned between the absorber and the substrate.

32. The method of claim 23, wherein the coupling between the first antenna and the second antenna is less than −15 decibels (dB) from at least 1.0 Gigahertz (GHZ) to at least 3.0 GHZ.

* * * * *